(12) United States Patent
Chen

(10) Patent No.: US 7,558,749 B2
(45) Date of Patent: Jul. 7, 2009

(54) TECHNOLOGY EVALUATION SYSTEM AND METHOD

(75) Inventor: William Chen, Chung-Ho (TW)

(73) Assignee: Iptec Inc., Taipei (TW)

( * ) Notice: Subject to any disclaimer, the term of this patent is extended or adjusted under 35 U.S.C. 154(b) by 1235 days.

(21) Appl. No.: 10/189,562

(22) Filed: Jul. 8, 2002

(65) Prior Publication Data

US 2003/0061140 A1 Mar. 27, 2003

(51) Int. Cl.
*G06Q 10/00* (2006.01)
(52) U.S. Cl. ........................................ 705/35
(58) Field of Classification Search ............ 705/1, 705/10, 35, 36, 37
See application file for complete search history.

(56) References Cited

U.S. PATENT DOCUMENTS

| | | | | |
|---|---|---|---|---|
| 5,999,907 | A * | 12/1999 | Donner | 705/1 |
| 6,263,314 | B1 * | 7/2001 | Donner | 705/1 |
| 6,452,613 | B1 * | 9/2002 | Lefebvre et al. | 715/733 |
| 6,665,656 | B1 * | 12/2003 | Carter | 707/3 |
| 6,832,211 | B1 * | 12/2004 | Thomas et al. | 705/36 R |
| 6,959,280 | B1 * | 10/2005 | Risen et al. | 705/4 |
| 7,188,069 | B2 * | 3/2007 | Hagelin | 705/1 |
| 7,216,100 | B2 * | 5/2007 | Elliott | 705/1 |
| 7,228,288 | B2 * | 6/2007 | Elliott | 705/35 |
| 2002/0002524 | A1 * | 1/2002 | Kossovsky et al. | 705/36 |
| 2002/0099637 | A1 * | 7/2002 | Wilkinson et al. | 705/36 |
| 2003/0212572 | A1 * | 11/2003 | Poltorak | 705/1 |
| 2004/0010393 | A1 * | 1/2004 | Barney | 702/181 |
| 2004/0220842 | A1 * | 11/2004 | Barney | 705/7 |

* cited by examiner

*Primary Examiner*—Hani Kazimi
*Assistant Examiner*—Bijendra K Shrestha
(74) *Attorney, Agent, or Firm*—Banger Shia

(57) ABSTRACT

An evaluation system generating a predicted value of a technology is provided. The evaluation system is primarily based on the R&D Value and the Patent Value to generate the predicted value of a technology. The evaluation system comprises a first database, a second database, an intangible asset pricing device, a factor producing device, an input device, and an analytic device The first database stores a set of stock prices of each company of a group of reference companies. The second database stores a set of net asset values, corresponding to the set of stock prices of each company of the group of reference companies. The intangible asset pricing device produces a set of intangible asset predicted values of each company of the group of reference companies according to the set of stock prices and the set of net asset values of each company of the reference companies. The factor producing device, responsive to a first predetermined condition, divides the group of reference companies into N compared subgroups, and the factor producing device also produces a set of referred factors of each of the N compared subgroups according to the N compared subgroups and the set of intangible asset predicted values of each company of the group of reference companies. The input device is for inputting a predetermined time and a predetermined cost of the technology needed for launch. The analytic device then maps the technology to one corresponding subgroup of the N compared subgroups, and then the analytic device, according to the predetermined time, the predetermined cost and the set of referred factors of the corresponding subgroup, produces the predicted value of the technology.

8 Claims, 3 Drawing Sheets

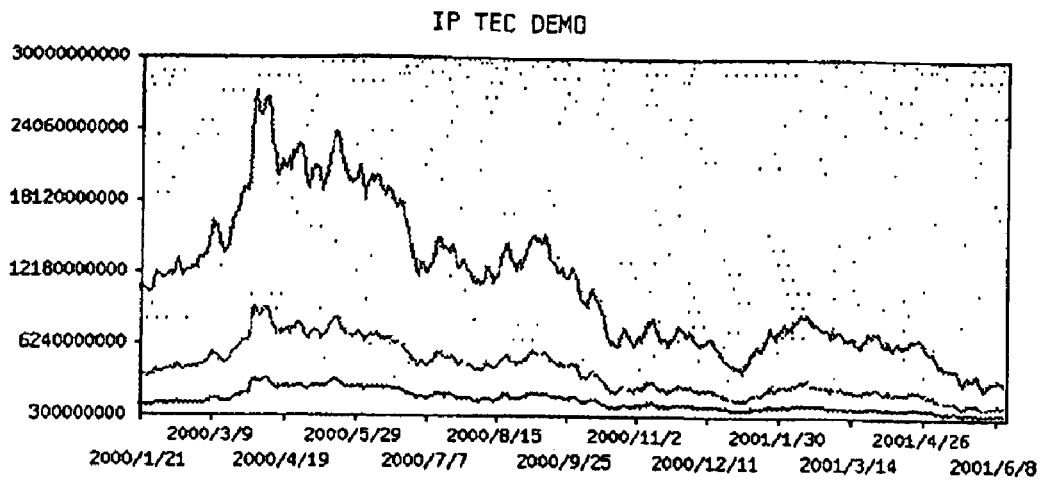
FIG. 2(a) The curve of the Intangible Value
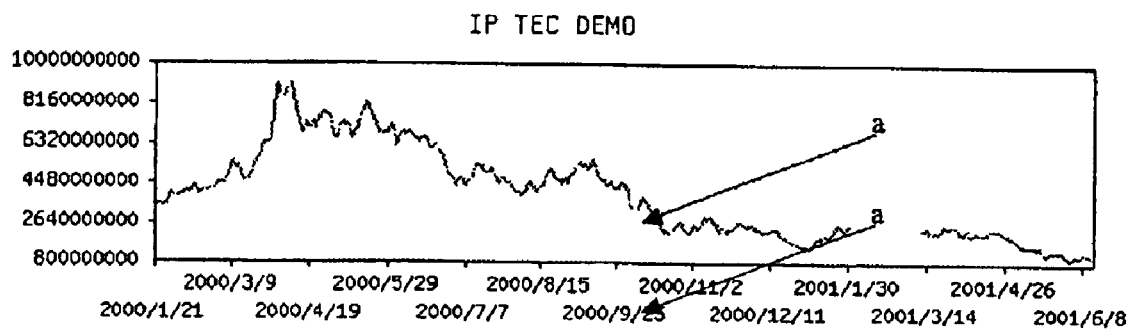
FIG 2(b) The curve of the R&D Value
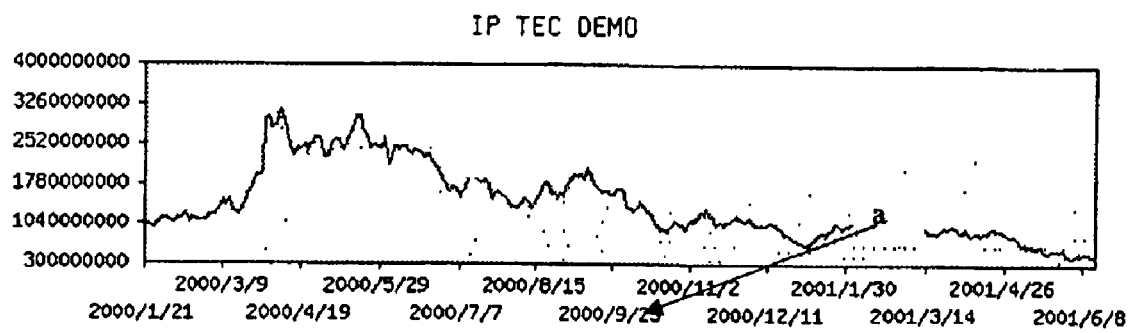
FIG. 2(c) The curve of the Patent Value

TECHNOLOGY EVALUATION SYSTEM AND METHOD

FIELD OF THE INVENTION

The present invention relates to a technology evaluation system, and particularly, relates to a technology evaluation system for generating a predicted value of a patent.

BACKGROUND OF THE INVENTION

The constituent factors of corporations or businesses at its early stages are the great amount of labors and assets The labors and assets are so-called tangible assets.

After purchasing the equipment, such as plant and machines, and land, the corporation gains profit from selling the products produced by the labors Therefore, we traditionally assess the character or the profitable capability of a company by its tangible assets. These tangible assets can be measured by the several accounting principles. By the way, these tangible assets can be easily traded on the market. Companies proceed finance acts of the tangible assets to increase the operation flexibility On the other hand, the value of the intangible assets in companies is gradually beyond the tangible assets. The knowledge, which we called the intangible assets, gradually generates the maximum effort to the companies In other words, besides tangible asset, the intangible assets have become the important factors of a company The intangible assets of a business or a company include different kinds, such as marketing, supply chain, customer relationship, brand, education level of the employees, R&D, company's patent and the quantity of the trademark. The intangible assets and the profitable capability of a company are often positive related especially in a high-tech industry. Take Microsoft for example, Microsoft mainly produces the computer operating system and the software. The computer operating system and software have a high market share in the global market. The generation of these systems are not depends on the land or any other equipment, but the creation of a human being, R&D, and marketing skills. The value of the stock market is 44.6 billion higher than the net asset of the Microsoft in April 1995 according to the statistics A 99' report of Baruch Lev, a professor of financial accounting in American New York University, shows that the profit and the value of a company influenced by the R&D capability which reflected by the quantity and the quality of the patent. IBM is another example indicated that the patent has great influence on the entire profit of a company The income from the license grant of IBM in 1990 is about 300 million, while in 2000 is about one billion. The license grant occupies one-nine of the IBM profit-before-tax. The value of the stock market is 54 billion higher then the net asset of the IBM in April 1995 From the aforementioned cases, we can easily find the influence of the intangible assets.

The intangible assets, such as patents and skills, cannot easily set a trading price as the tangible assets do It is harm for an intangible asset based company for that they cannot get a proper financial assistance by these patents and technologies. Secondly, when transferring techniques or authorizing the patents, the licensor and licensee cares not only the skills and patents themselves but also the value of these patent or skills and the license grant for authorization These economic factors are the key issues whether we can successfully transfer techniques or authorize the patents or not.

There are three traditional valuation methods for evaluating the technique and patents. The Rules of Thumb is the first method. The most common form is so-called the 25 percent Rule The amount of the revenues is contributed and affected by several factors, such as the technique, marketing management, and the combination of the inner-enterprise resources. The contribution of the technique is about 25% of the revenues.

However, according to a statistics report published on the journal of les *Nouvelless* in 1997, even if the technique causes a raise of the revenues over 80%, the licensee is unwilling to pay more than 15% of the total revenues. Besides, the Rules of Thumb method is based on a unitary concept without considering the difference and the risk between different industries or different technologies.

The second method, as showed in the U S. Pat. No. 6,154,725, is the Rating/Ranking method The method obtains a predicted value of a technique by comparing the present trade information and price information thereof with the previously existed trade information and price information of other similar transaction collected in the technique trade market However, the trade information and price information of previously existed transaction in the technique trade market will usually be hold in privacy. It is not easy to get an appropriate reference sample for this method.

The third traditional valuation method for evaluating the technique and patents is the Discounted Cash Flow method (DFC). The DFC method introduces the Risk Adjusted Hurdle Rate (RAHR, designated by 'k') as a mean for characterizing the overall commercial risk. The DFC method converts the forecasted economic life and the net profit of the technique to the future cash flows.

Although the DCF method provides a definite mathematical formula, it has several disadvantages. One disadvantages is that the method have to forecast the sell revenues and the cost of the technique each year within the economic life by human estimation and errors certainly occurred Another disadvantage is that the DCF method can't consider the future risk.

SUMMARY OF THE INVENTION

To solve the aforementioned problems, the invention provides a technology evaluation system for generating the predicted value of the technology. The technology evaluation system includes a first database, a second database, an intangible asset pricing device, a factor producing device, an input device, and an analytic device. The first database stores a set of stock prices of each company of a group of reference companies. The second database stores a set of net asset values, of each company of the group of reference companies. According to the set of stock prices and the set of net asset values of each company of the reference companies, the intangible asset pricing device produces a set of intangible asset predicted values of each company of the group of reference companies. The factor producing device, responsive to a first predetermined condition, divides the group of reference companies into N compared subgroups. The factor producing device also produces a set of referred factors of any of the N compared subgroups according to the N compared subgroups and the set of intangible asset predicted values of each company of the group of reference companies. The input device inputs a predetermined time and a predetermined cost of the technology needed for launch. The analytic device maps the technology to one corresponding subgroup of the N compared subgroups, and also produces the predicted value of the technology according to the predetermined time, the predetermined cost and the set of referred factors of the corresponding subgroup.

Another object of the invention is to provide a technology evaluation method The method generate the predicted value of the technology including several steps as follows:
(1) storing a set of stock prices of each company of a group of reference companies,
(2) storing a set of net asset values of each company of the group of reference companies;
(3) producing a set of intangible asset predicted values of each company of the group of reference companies responsive to said stock prices and said net asset values of each company of a group of reference companies;
(4) dividing the group of reference companies into N compared subgroups responsive to a first predetermined condition;
(5) producing a set of referred factors of any of the N compared subgroups according to the N compared subgroups and the set of intangible asset predicted values of each company of the group of reference companies;
(6) inputting a predetermined time and a predetermined cost of the technology needed for launch;
(7) mapping the technology to one corresponding subgroup of the N compared subgroups;
(8) producing the predicted value of the technology according to the predetermined time, the predetermined cost and the set of referred factors of the corresponding subgroup These and other objectives of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 2(a) is a schematic diagram showing the average value of the intangible value of a group of reference companies, which is the topmost line.

FIG. 2(b) is a schematic diagram showing the average value of the research-and-develop value of a group of reference companies.

FIG. 2(c) is a schematic diagram showing the average value of the Patent value of a group of reference companies.

DETAILED DESCRIPTION OF THE INVENTION

Figure 1:
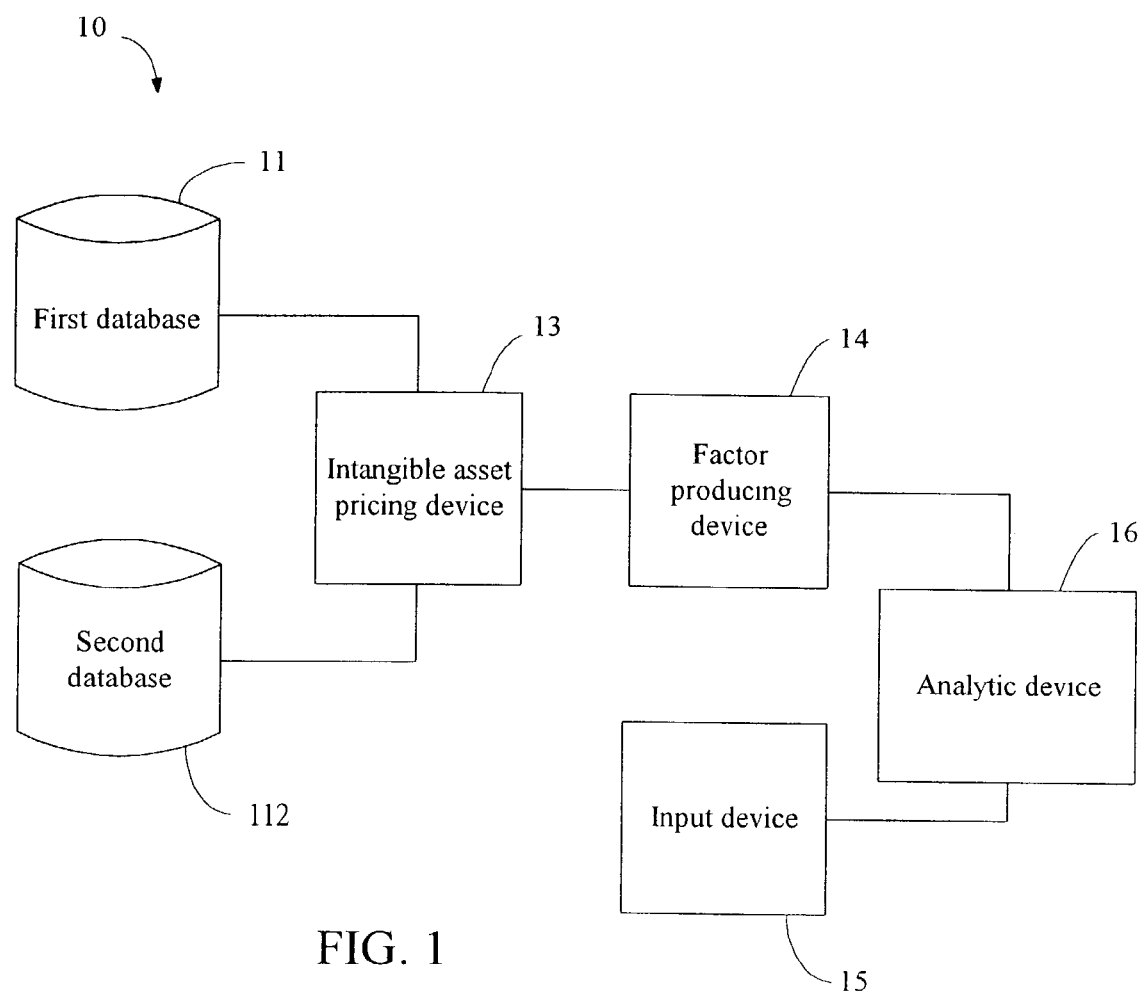
FIG. 1 is a schematic diagram of an evaluation system 10 according to the invention.

Referring to FIG. 1. FIG. 1 is a schematic diagram of the evaluation system 10 according to the invention. The evaluation system includes a first database 11, a second database 12, an intangible asset pricing device 13, a factor producing device 14, an input device 15, and an analytic device 16. The first database 11 stores a set of stock prices of each company of a group of reference companies, for example, the first database 11 stores a set of stock trading prices of each company of a group of reference companies. The second database 12 stores a set of net asset values of each company of the group of reference companies. The net asset value of a company usually can be found in its financial statement For example, the net asset value can be defined as the Shareholders' Equity recorded in the Balance Sheet of each company.

The intangible asset pricing device 13 produces a set of intangible asset predicted values of each company of the group of reference companies according to the set of stock prices and the set of net asset values of each company of the reference companies. The set of intangible asset predicted values includes an intangible value, a research-and-develop value or a patent value. The intangible value is defined as follows:

$$\text{The intangible value} = \quad (1)$$
$$(\text{Stock price} \times \text{Issued and outstanding shares}) - \text{Net asset values}$$

Take a company, A Inc., for example. The stock price is $70 dollars per share, the issued and outstanding shares are 500 thousand shares, the Shareholders' Equity is $20 million. The intangible value of A, Inc. is as follows:

($70 dollars per share×500 thousand shares)−$20 million=$15 million

The set of intangible asset predicted values could include a research-and-develop value. The research-and-develop value is defined as follows:

$$(\text{Stock price} \times \text{Issued and outstanding shares}) - \text{Net asset values}) \times \quad (2)$$
$$R\&D \text{ expense} \div \text{Total expense}$$

Wherein the R&D expense and the Total expense are recorded in the financial statement. Take a company, A Inc, for example. The stock price is $70 dollars per share, the issued and outstanding shares are 500 thousand, the Shareholders' Equity is $20 million, the R&D expense is $6 million, and the total expense is $12 million. The R&D Value of A, Inc. is as follows:

(($70 dollars per share×500 thousand shares)−$20 million)×6/12=$7.5 million

The set of intangible asset predicted values include a patent value The patent value is defined as follows $$((\text{Stock price} \times \text{Issued and outstanding shares}) - \text{Net asset values}) \times \quad (3)$$
$$R\&D \text{ expense} \div \text{Total expense} \div \text{patent numbers}$$

Wherein the patent numbers of a company can be the patent numbers obtained in single country, the sum of the patent numbers obtained in all countries or the patent numbers of different contents Take a company, A Inc., for example The stock price is $70 dollars per share, the issued and shares outstanding are 500 thousand shares, the Shareholders' Equity is $20 million, the R&D expense is $6 million, the total expense is $12 million, and the patent numbers is 15. The Patent Value of A, Inc. is as follows:

(($70 dollars per share × 500 thousand shares) − $20 million) ×
$$6/12 \div 15 = \$500{,}000 \text{ dollars}$$

The factor producing device 14, responsive to a first predetermined condition, divides the group of reference companies into N compared subgroups. The first predetermined condition can be industry category or product category, or other conditions related to patent or technology category For example, the group of reference companies can be divided by industry category such as Electronic Industry, Mechanical Industry, Biotechnology Industry or Chemical industry. The, product category such as the motherboard, the CD-ROM drive, or the LED could be used as well. After dividing the group of reference companies into N compared subgroups, the factor producing device 14 produces a set of referred factors of any of the N compared subgroups according to set of intangible asset predicted values of each company of the group of reference companies The set of referred factors of the corresponding subgroup could includes the following (1) an average of the R&D value and a first standard deviation (SD) of the R&D value; (2) an average of the patent value and a first SD of the patent value, (3) a weighted average of the intangible value and a second SD of the Intangible value, (4) a weighted average of the R&D Value and a second SD of the R&D value; (5) a weighted average of the patent value and a second SD of the patent value; (6) the combination of (1) and (2), (7) the combination of (3) and (4); (8) the combination of (4) and (5), or (9) the combination of (1), an average of the intangible value and a first SD of the Intangible value. Take the average of the intangible value for example to show how to calculate the value. First, averaging the intangible value of each company of one corresponding subgroup in the N compared subgroups according, to the same time-point criterion to produce a set of first average value in a selected period. The corresponding subgroup is decided by the analytic device 16 which can maps the technology to the corresponding subgroup of the N compared subgroups. Secondly, within the selected time period, average all of the first average values to produce the average intangible value. The average R&D value and the average Patent value can be produced by the same way.

After the set of first average values of the intangible value of each company of a group of reference companies are produced, the first SD of the Intangible value is defined as follows.

$$\sqrt{\sum_{i=1}^{n}(R_i - \overline{R})^2 / n} \quad (4)$$

In the equation (4), $R_i = \ln(S_1/S_{1-i})$, '$S_1$' is the first average value of the intangible value at an individual time-point i, 'n' is the total sampled time points; '$\overline{R}$' is the average of all R. Similarly, the first SD of the R&D value and the first SD of the patent value can be produced.

Referring to FIG. 2(*a*), the topmost line in FIG. 2(*a*) is a schematic diagram showing the set of first average values of the intangible value of the corresponding subgroup in the selected time period FIG. 2(*b*) is a schematic diagram showing a set of the first average values of the R&D value of the corresponding subgroup in the selected time period. FIG. 2(*c*) is a schematic diagram showing a set of the first average values of the Patent value of the corresponding subgroup in the selected time period Within the selected time period, the average of Intangible value, the average of R&D value, the average of patent value, the first SD of Intangible value, the first SD of R&D value, the first SD of patent value can then be generated.

The weighted average of the Intangible Value can be produced as follows. First, a set of first weighted average of the intangible values of the corresponding subgroup is generated, and the first weighted average of the intangible value is:

$$WIV = \sum_{i=1}^{k} \alpha_i x_i$$

Where the WIV is the first weighted average of the intangible value at a certain time-point; k is the number of companies included in the corresponding subgroup; $x_i$ is the intangible value of the ith company in the corresponding subgroup; $\alpha_i$ is a ratio factor of the Intangible value of the ith company. The ratio factor of the intangible value can be defined according to the sell volume, the market share, or other indexes.

Then, the weighted average of the intangible value is collecting and averaging the set of the first weighted averages of the Intangible value within the selected time period With the set of first weighted averages of the intangible value, the second SD of the Intangible value can be calculated similar to equation (4) The weighted average of the R&D value and the weighted average of the Patent value can be produced by the same way The input device 15 can input a predetermined time and a predetermined cost of the technology needed for launch. The analytic device 16 maps the technology to the corresponding subgroup of the N compared subgroups The analytic device 16 also produces the predicted value of the technology according to the predetermined time, the predetermined cost and the set of referred factors of the corresponding subgroup.

The predicted value of the technology produced by the analytic device 16 is described as follows:

$$EV1 = RV*N(d1) - (E/e^{rT})*N(d2) \quad (5)$$

Wherein 'EV1' is the predicted value of said technology, 'RV' is the average of the R&D value of the corresponding subgroup, 'E' is said predetermined cost of the technology needed for launch, 'T' is said predetermined time of the technology needed for launch, 'e' is a natural exponent, 'r' is a predetermined rate, 'N(d1)' is an accumulative standard normal distribution function value at d1, 'N(d2)' is an accumulative standard normal distribution function value at d2, $d1 = (\ln(RV/E) + rT)/(\delta T^{1/2}) + 0.5T^{1/2}$, $d2 = d1 - \delta T^{1/2}$, $\delta$ is the first SD of the R&D value of the corresponding subgroup. In other words, the predicted value is produced based on the Option theory, Black-Scholes model, by the analytic device 16 according to the predetermined cost, the predetermined time and the set of referred factors of the corresponding subgroup Purchasing a call option means getting the right of one stock with an executive price in a predetermined time period Purchasing one technology or patent means having the right to produce one product, that one can make a profit from it, with a fixed operation cost in a predetermined time period. Therefore, there is something similar between the prices of the options and the patent or technology While using the Black-Scholes model for evaluating the patent or the technology, the meaning of the corresponding factors must be redefined as follows

| Call option value | Technology value |
|---|---|
| Call option value | The predicted value of technology |
| The present value of the corresponding Stock of the option | The average R&D value of the group of reference companies |
| Executive price | Predetermined cost of the technology needed for launch |

-continued

| Call option value | Technology value |
| --- | --- |
| Executive time | Predetermined time of the technology needed for launch |
| A predetermined rate | A predetermined rate |
| The standard deviation of the corresponding Stock Market Investment Return of the option | The first standard deviation of the R&D value of the group of reference companies |

In embodiment 2, as shown in the above Table, the average of the Patent value can be substitute for the average of the R&D value, and the first SD of the Patent value can be substitute for the first SD of the R&D value. The predicted value of the technology is defined as follows:

$$EV2=PV \cdot N(d1)-(E/e^{rT}) \cdot N(d2)$$

Wherein EV2 is the predicted value of the technology, PV is the average of the patent value of the corresponding subgroup, E is the predetermined cost of the technology needed for launch, T is the predetermined time of the technology needed for launch, e is a natural exponent, r is a predetermined rate, N(d1) is an accumulative standard normal distribution function value at d1, N(d2) is an accumulative standard normal distribution function value at d2, $d1=(\ln(PV/E)+rT)/(\delta T^{1/2})+0.5\delta T^{1/2}$, $d2=d1\delta T^{1/2}$, $\delta$ is the first standard deviation of the Patent Value of the corresponding subgroup.

With EV1 and EV2, in embodiment 3 the analytic device 16 can also produces a predicted value of said technology, which is smaller than EV1 but equal to or greater than EV2

In embodiment 4, the weighted average of the R&D value can be substitute for the average of the R&D value, and the second SD of the R&D value can be substitute for the first SD of the R&D value. The predicted value of the technology is defined as follows $$EV4=WRV*N(d1)-(E/e^{rT})*N(d2);$$

Wherein EV4 is the predicted value of the technology, WRV is the weighted average of the research-and-develop value of the corresponding subgroup, E is the predetermined cost of the technology needed for launch, T is the predetermined time of the technology needed for launch, e is a natural exponent, r is a predetermined rate, N(d1) is an accumulative standard normal distribution function value at d1, N(d2) is an accumulative standard normal distribution function value at d2, $d1=(\ln(WRV/E)+rT)/(\delta T^{1/2})+0.5\delta T^{1/2}$, $d2=d1-\delta T^{1/2}$, $\delta$ is the second standard deviation of the research-and-develop value of the corresponding subgroup.

In embodiment 5, the weighted average of the Patent value can be substitute for the average of the R&D value, and the second SD of the Patent value can be substitute for the first SD of the R&D value. The predicted value of the technology is defined as follows:

$$EV5=WPV*N(d1)-(E/e^{rT})*N(d2);$$

Wherein EV5 is the predicted value of the technology, WPV is the weighted average of the patent value of the corresponding subgroup, E is the predetermined cost of the technology needed for launch, T is the predetermined time of the technology needed for launch, e is a natural exponent, r is a predetermined rate, N(d1) is an accumulative standard normal distribution function value at d1, N(d2) is an accumulative standard normal distribution function value at d2, $d1=(\ln(WPV/E)+rT)/(\delta T^{1/2})+0.5\delta T^{1/2}$, $d2=d1-\delta T^{1/2}$, $\delta$ is the second standard deviation of the patent of the corresponding subgroup.

With the EV4 and EV5, in embodiment 6 the analytic device 16 produces a predicted value of said technology, which is smaller than EV4 but equal to or greater than EV5.

In embodiment 7, if the corresponding subgroup is mostly consisted of small companies or start-up companies, the weighted average of the intangible value can be substitute for the average of the R&D value in the above table, and the second SD of the intangible value can be substitute for the first SD of the R&D value. The predicted value of the technology is defined as follows:

$$EV3=WIV*N(d1)-(E/e^{rT})*N(d2);$$

Wherein EV3 is said predicted value of said technology, WIV is said weighted average of said intangible value of said corresponding subgroup, E is said predetermined cost of the technology needed for launch, T is said predetermined time of the technology needed for launch, e is a natural exponent, r is a predetermined rate, N(d1) is an accumulative standard normal distribution function value at d1, N(d2) is an accumulative standard normal distribution function value at d2, $d1=(\ln(WIV/E)+rT)/(\delta_3 T^{1/2})+0.5\delta_3 T^{1/2}$, $d2=d1-\delta_3 T^{1/2}$, $\delta_3$ is said second standard deviation of said intangible value of said corresponding subgroup With the above-mentioned EV4 and EV3, in another embodiment 8 the analytic device 16 produces the predicted value of said technology, which is smaller than EV3 but equal to or greater than EV4.

Figure 3:
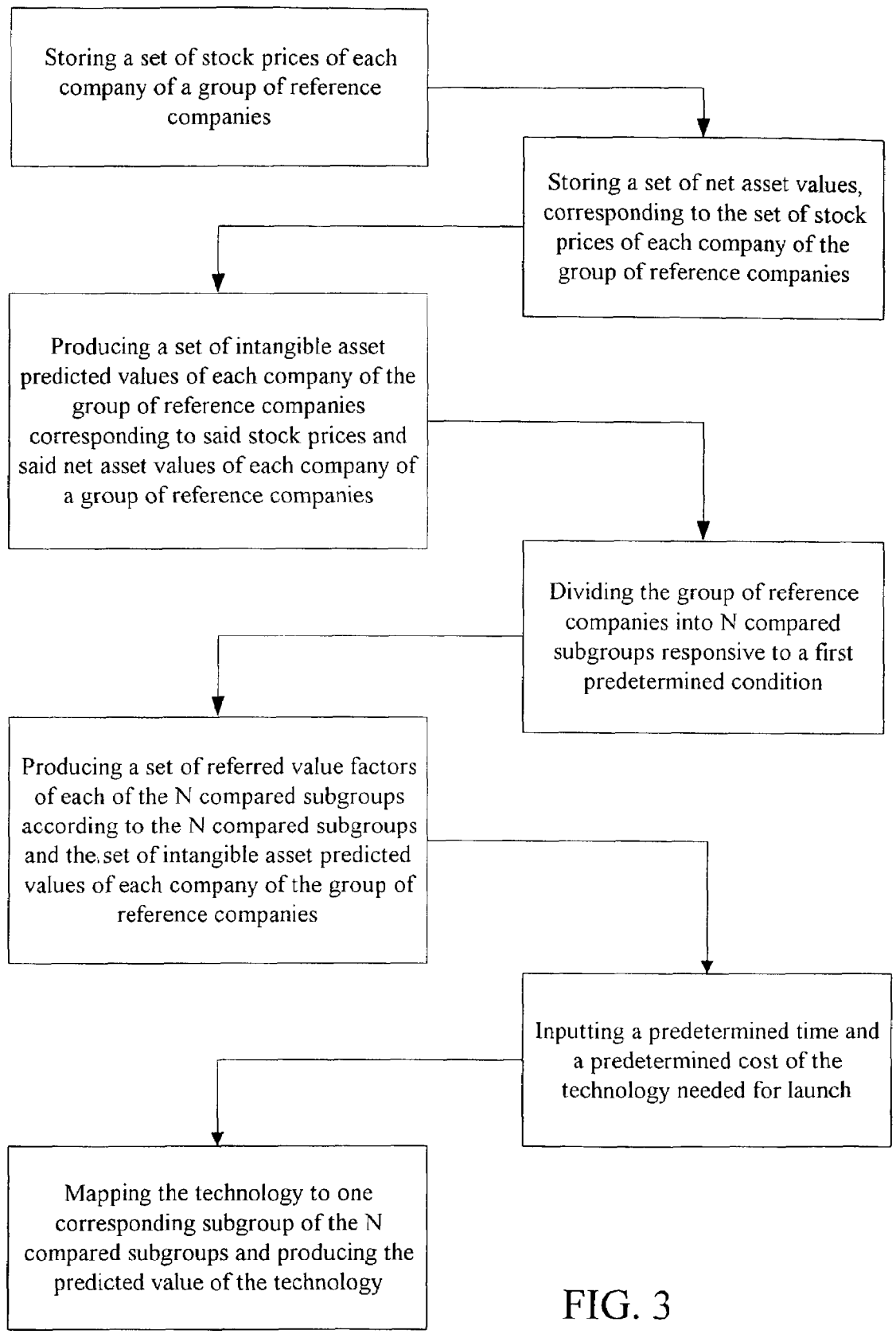
FIG. 3 is a flow chart of the evaluation method according to the invention.

In the embodiment 9, the analytic device 16 produces a predicted value of the technology, which is smaller than EV but equal or larger than EV1. Wherein EV1 is mentioned in equation (5), $EV=IV*N(d1)-(E/e^{rT})*N(d2)$, IV is the average value of intangible value of the corresponding group, E is said predetermined cost of the technology needed for launch, T is said predetermined time of the technology needed for launch, e is a natural exponent, r is a predetermined rate, N(d1) is an accumulative standard normal distribution function value at d1, N(d2) is an accumulative standard normal distribution function value at d2, $d1=(\ln(IV/E)+rT)/(\delta T^{1/2})+0.5\delta T^{1/2}$, $d2=d1-\delta T^{1/2}$, $\delta$ is said second standard deviation of said intangible value of said corresponding subgroup Besides, The invention provides an evaluation method, which is based on the R&D value and the Patent value of the different categories of industry or products, for producing a set of referred factors. Then, produce the predicted value of a technology according to the set of referred factors. Refer to the FIG. 3. FIG. 3 is a flow chart of the evaluation method according to the invention. The method includes several steps:

(1) storing a set of stock prices of each company of a group of reference companies;

(2) storing a set of net asset values, corresponding to the set of stock prices of each company of the group of reference companies;

(3) producing a set of intangible asset predicted values of each company of the group of reference companies corresponding to said stock prices and said net asset values of each company of a group of reference companies, (4) dividing the group of reference companies into N compared subgroups responsive to a first predetermined condition;

(5) producing a set of referred factors of any of the N compared subgroups according to the N compared subgroups and the set of intangible asset predicted values of each company of the group of reference companies;

(6) inputting a predetermined time and a predetermined cost of the technology needed for launch;

(7) mapping the technology to one corresponding subgroup of the N compared subgroups;

(8) producing the predicted value of the technology according to the predetermined time, the predetermined cost and the set of referred value factors of the corresponding subgroup.

Wherein the set of intangible asset predicted values includes an intangible value, a research-and-develop value or a patent value The first predetermined condition could be industry classification, product classification, or other conditions related to patent or technology classification, so that the invention, responsive to the first predetermined condition, can divides the group of reference companies into N compared subgroups. The set of referred factors of the corresponding subgroup includes: (1) an average of the R&D value and a first standard deviation (SD) of the R&D value; (2) an average of the patent value and a first SD of the patent value; (3) a weighted average of the intangible value and a second SD of the Intangible value; (4) a weighted average of the R&D Value and a second SD of the R&D value; (5) a weighted average of the patent value and a second SD of the patent value; (6) the combination of (1) and (2); (7) the combination of (3) and (4); (8) the combination of (4) and (5), or (9) the combination of (1), an average of the intangible value and a first SD of the Intangible value.

The 7th step is mapping the technology to the corresponding subgroup according to the first predetermined condition The 8th step is to produce the predicted value of the technology according to the predetermined time, predetermined cost and the set of referred factors. As the embodiments described above, the predicted value of the technology could be produced in many different ways.

With the example and explanations above, the features and spirits of the invention will be hopefully well described those skilled in the art will readily observe that numerous modifications and alterations of the device may be made while retaining the teaching of the invention accordingly, the above disclosure should be construed as limited only by the metes and bounds of the appended claims

What is claimed is:

1. An evaluation system, for generating a predicted value of a technology, comprising:
    a first database for storing a set of stock prices of each company of a group of reference companies;
    a second database for storing a set of net asset values of each company of the group of reference companies;
    an intangible asset pricing device, responsive to the set of stock prices and the set of net asset values of each company the group of reference companies, for producing a set of intangible asset predicted values of each company of the group of reference companies;
    a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;
    a input device for inputting a predetermined time and a predetermined cost of the technology needed for launch; and
    an analytic device for mapping the technology to a corresponding subgroup of the N compared subgroups, the analytic device also being responsive to the predetermined time, the predetermined cost and the set of referred factors of the corresponding subgroup for producing the predicted value of the technology;
    wherein the set of intangible asset predicted values of each company of the group of reference companies comprises a research-and-develop value and a patent value, and the research-and-develop value is as follows:

$$V_{RD}=(Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_P = V_{RD} \times \div N_P,$$

wherein $V_P$ is the patent value, $V_{RD}$ is the research-and-develop value, and $N_P$ is the issued patent number of each company of the group of reference companies;

wherein the set of referred factors of the corresponding subgroup comprises an average of the research-and-develop value of each company of the corresponding subgroup and a first standard deviation of the research-and-develop value of each company of the corresponding subgroup, and the predicted value of the technology is produced by the analytic device as follows:

$$EV1 = RV*N(d1) - (E/e^{rT})*N(d2),$$

wherein EV1 is the predicted value of the technology, RV is the average, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, $d1=(\ln(RV/E)+rT)/(\delta_1 T^{1/2})+0.5\delta_1 T^{1/2}$, $d2=d1-\delta_1 T^{1/2}$, and $\delta_1$ is the first standard deviation.

2. An evaluation system, for generating a predicted value of a technology, comprising:
    a first database for storing a set of stock prices of each company of a group of reference companies;
    a second database for storing a set of net asset values of each company of the group of reference companies;
    an intangible asset pricing device, responsive to the set of stock prices and the set of net asset values of each company the group of reference companies, for producing a set of intangible asset predicted values of each company of the group of reference companies;
    a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;
    a input device for inputting a predetermined time and a predetermined cost of the technology needed for launch; and
    an analytic device for mapping the technology to a corresponding subgroup of the N compared subgroups, the analytic device also being responsive to the predetermined time, the predetermined cost and the set of referred factors of the corresponding subgroup for producing the predicted value of the technology;

wherein the set of intangible asset predicted values of each company of the group of reference companies comprises a research-and-develop value and a patent value, and the research-and-develop value is as follows:

$$V_{RD} = (Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_p = V_{RD} \times \div N_P,$$

wherein $V_p$ is the patent value, $V_{RD}$ is the research-and-develop value, and $N_P$ is the issued patent number of each company of the group of reference companies;

wherein the set of referred factors of the corresponding subgroup comprises an average of the patent value of each company of the corresponding subgroup and a first standard deviation of the patent value of each company of the corresponding subgroup, and the predicted value of the technology is produced by the analytic device as follows:

$$EV2 = PV*N(d1) - (E/e^{rT})*N(d2),$$

wherein EV2 is the predicted value of the technology, PV is the average, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, $d1=(\ln(RV/E)+rT)/(\delta_2 T^{1/2})+0.5\delta_2 T^{1/2}$, $d2=d1-\delta_2 T^{1/2}$, and $\delta_2$ is the first standard deviation.

3. An evaluation system, for generating a predicted value of a technology, comprising:
a first database for storing a set of stock prices of each company of a group of reference companies;
a second database for storing a set of net asset values of each company of the group of reference companies;
an intangible asset pricing device, responsive to the set of stock prices and the set of net asset values of each company the group of reference companies, for producing a set of intangible asset predicted values of each company of the group of reference companies;
a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;
a input device for inputting a predetermined time and a predetermined cost of the technology needed for launch; and
an analytic device for mapping the technology to a corresponding subgroup of the N compared subgroups, the analytic device also being responsive to the predetermined time, the predetermined cost and the set of referred factors of the corresponding subgroup for producing the predicted value of the technology;

wherein the set of intangible asset predicted values of each company of the group of reference companies comprises a research-and-develop value and a patent value, and the research-and-develop value is as follows:

$$V_{RD} = (Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_p = V_{RD} \times \div N_P,$$

wherein $V_p$ is the patent value, $V_{RD}$ is the research-and-develop value, and $N_P$ is the issued patent number of each company of the group of reference companies;

wherein the set of referred factors of the corresponding subgroup comprises a weighted average of the research-and-develop value of each company of the corresponding subgroup and a second standard deviation of the research-and-develop value of each company of the corresponding subgroup, and the predicted value of the technology is produced by the analytic device as follows:

$$EV4 = WRV * N(d1) - (E/e^{rT}) * N(d2);$$

wherein EV4 is the predicted value of the technology, WRV is the weighted average, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, $d1=(\ln(WRV/E)+rT)/(\delta_4 T^{1/2})+0.5\delta_4 T^{1/2}$, $d2=d1-\delta_4 T^{1/2}$, and $\delta_4$ is the second standard.

4. An evaluation system, for generating a predicted value of a technology, comprising:
a first database for storing a set of stock prices of each company of a group of reference companies;
a second database for storing a set of net asset values of each company of the group of reference companies;
an intangible asset pricing device, responsive to the set of stock prices and the set of net asset values of each company the group of reference companies, for producing a set of intangible asset predicted values of each company of the group of reference companies;
a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;

a input device for inputting a predetermined time and a predetermined cost of the technology needed for launch; and an analytic device for mapping the technology to a corresponding subgroup of the N compared subgroups, the analytic device also being responsive to the predetermined time, the predetermined cost and the set of referred factors of the corresponding subgroup for producing the predicted value of the technology;

wherein the set of intangible asset predicted values of each company of the group of reference companies comprises a research-and-develop value and a patent value, and the research-and-develop value is as follows:

$$V_{RD}=(Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_p = V_{RD} \times \div N_P,$$

wherein $V_p$ is the patent value, $V_{RD}$ is the research-and-develop value, and $N_P$ is the issued patent number of each company of the group of reference companies;

wherein the set of referred factors of the corresponding subgroup comprises a weighted average of the patent value of each company of the corresponding subgroup and a second standard deviation of the patent value of each company of the corresponding subgroup, and the predicted value of the technology is produced by the analytic device as follows:

$$EV5=WPV*N(d1)-(E/e^{rT})*N(d2);$$

wherein EV5 is the predicted value of the technology, WPV is the weighted average, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, d1=(ln(WRV/E)+rT)/($\delta_5 T^{1/2}$)+0.5$\delta_5 T^{1/2}$, d2=d1−$\delta_5 T^{1/2}$, and $\delta_5$ is the second standard deviation.

5. An evaluation system, for generating a predicted value of a technology, comprising:

a first database for storing a set of stock prices of each company of a group of reference companies;

a second database for storing a set of net asset values of each company of the group of reference companies;

an intangible asset pricing device, responsive to the set of stock prices and the set of net asset values of each company the group of reference companies, for producing a set of intangible asset predicted values of each company of the group of reference companies;

a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;

a input device for inputting a predetermined time and a predetermined cost of the technology needed for launch; and an analytic device for mapping the technology to a corresponding subgroup of the N compared subgroups, the analytic device also being responsive to the predetermined time, the predetermined cost and the set of referred factors of the corresponding subgroup for producing the predicted value of the technology;

wherein the set of intangible asset predicted values of each company of the group of reference companies comprises a research-and-develop value and a patent value, and the research-and-develop value is as follows:

$$V_{RD}=(Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_p = V_{RD} \times \div N_P,$$

wherein $V_p$ is the patent value, $V_{RD}$ is the research-and-develop value, and $N_P$ is the issued patent number of each company of the group of reference companies;

wherein the set of referred factors of the corresponding subgroup comprises an average of the research-and-develop value of each company of the corresponding subgroup, a first standard deviation of the research-and-develop value of each company of the corresponding subgroup, an average of the patent value of each company of the corresponding subgroup, and a first standard deviation of the patent value of each company of the corresponding subgroup, and the predicted value of the technology is smaller than EV1 but equal to or greater than EV2, wherein EV1=RV*N(d1)−(E/$e^{rT}$)*N(d2), EV2=PV*N(d3)−(E/$e^{rT}$)*N(d4), RV is the average of the research-and-develop value of each company of the corresponding subgroup, PV is the average of the patent value of each company of the corresponding subgroup, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, d1=(ln(RV/E)+rT)/($\delta_1 T^{1/2}$)+0.5$\delta_1 T^{1/2}$, d2=d1−$\delta_1 T^{1/2}$, $\delta_1$ is the first standard deviation of the research-and-develop value of each company of the corresponding subgroup, N(d3) is the accumulative standard normal distribution function valued at d3, N(d4) is the accumulative standard normal distribution function valued at d4, d3=(ln(PV/E)+rT)/($\delta_2 T^{1/2}$)+0.5$\delta_2 T^{1/2}$, d4=d3−$\delta_2 T^{1/2}$, $\delta_2$ is the first standard deviation of the patent value of each company of corresponding subgroup.

6. An evaluation system, for generating a predicted value of a technology, comprising:

a first database for storing a set of stock prices of each company of a group of reference companies;

a second database for storing a set of net asset values of each company of the group of reference companies;

an intangible asset pricing device, responsive to the set of stock prices and the set of net asset values of each company the group of reference companies, for producing a set of intangible asset predicted values of each company of the group of reference companies;

a factor producing device, responsive to a first predetermined condition, for dividing the group of reference companies into N compared subgroups, the factor producing device also being responsive to the N compared subgroups and the set of intangible asset predicted values of each company of the group of reference companies and producing a set of referred factors of any of the N compared subgroups;

a input device for inputting a predetermined time and a predetermined cost of the technology needed for launch; and an analytic device for mapping the technology to a corresponding subgroup of the N compared subgroups, the analytic device also being responsive to the predetermined time, the predetermined cost and the set of referred factors of the corresponding subgroup for producing the predicted value of the technology;

wherein the set of intangible asset predicted values of each company of the group of reference companies comprises a research-and-develop value and a patent value, and the research-and-develop value is as follows:

$$V_{RD}=(Vs \times Ns-Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_P=V_{RD} \times \div N_P,$$

wherein $V_p$ is the patent value, $V_{RD}$ is the research-and-develop value, and $N_P$ is the issued patent number of each company of the group of reference companies;

wherein the set of referred factors of the corresponding subgroup comprises an weighted average of the research-and-develop value of each company of the corresponding subgroup, a second standard deviation of the research-and-develop value of each company of the corresponding subgroup, an weighted average of the patent value of each company of the corresponding subgroup, and a second standard deviation of the patent value of each company of the corresponding subgroup, the predicted value of the technology is smaller than EV4 but equal to or greater than EV5, wherein EV4=WRV*N(d1)−(E/$e^{rT}$)*N(d2); EV5=WPV*N(d1)−(E/$e^{rT}$)*N(d2), WRV is the weighted average of the research-and-develop value of each company of the corresponding subgroup, WPV is the weighted average of the patent value of each company of the corresponding subgroup, E is the predetermined cost of the technology needed for launch, T is the predetermined time of the technology needed for launch, e is a natural exponent, r is a predetermined rate, N(d1) is an accumulative standard normal distribution function valued at d1, N(d2) is an accumulative standard normal distribution function valued at d2, $d1=(\ln(WRV/E)+rT)/(\delta_1 T^{1/2})+0.5\delta_1 T^{1/2}$, $d2=d1-\delta_1 T^{1/2}$, $\delta_1$ is the second standard deviation of the research-and-develop value of each company of the corresponding subgroup, N(d3) is the accumulative standard normal distribution function valued at d3, N(d4) is the accumulative standard normal distribution function valued at d4, $d3=(\ln(WPV/E)+rT)/(\delta_2 T^{1/2})+0.5\delta_2 T^{1/2}$, $d4=d3-\delta_2 T^{1/2}$, $\delta_2$ is the second standard deviation of the patent value of each company of the corresponding subgroup.

7. An evaluation method, for generating a predicted value of a technology, the method comprising:
(1) storing a set of stock prices of each company of a group of reference companies;
(2) storing a set of net asset values of each company of the group of reference companies;
(3) producing a set of intangible asset predicted values of each company of the group of reference companies by responding to the stock prices and the net asset values of each company of the group of reference companies;
(4) dividing the group of reference companies into N compared subgroups responsive to a first predetermined condition;
(5) producing a set of referred factors of any of the N compared subgroups according to the N compared subgroups and the set of intangible asset predicted values of each company of the group of reference companies;
(6) inputting a predetermined time and a predetermined cost of the technology needed for launch;
(7) mapping the technology to one corresponding subgroup of the N compared subgroups;
(8) producing the predicted value of the technology according to the predetermined time, the predetermined cost and the set of referred factors of the corresponding subgroup, wherein the set of intangible asset predicted values of each company of the group of reference companies comprises a research-and-develop value and a patent value, and the research-and-develop value is as follows:

$$V_{RD}=(Vs \times Ns-Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_P=V_{RD} \times \div N_P,$$

wherein $V_p$ is the patent value, $V_{RD}$ is the research-and-develop value, and $N_P$ is the issued patent number of each company of the group of reference companies wherein the set of referred factors of the corresponding subgroup comprises an weighted average of the research-and-develop value of each company of the corresponding subgroup, a second standard deviation of the research-and-develop value of each company of the corresponding subgroup, an weighted average of the patent value of each company of the corresponding subgroup, and a second standard deviation of the patent value of each company of the corresponding subgroup, the predicted value of the technology is smaller than EV4 but equal to or greater than EV5, wherein EV4=WRV*N (d1)−(E/e$^{rT}$)*N(d2); EV5=WPV*N(d1)−(E/e$^{rT}$)*N(d2), WRV is the weighted average of the research-and-develop value of each company of the corresponding subgroup, WPV is the weighted average of the patent value of each company of the corresponding subgroup, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, d1=(ln(WRV/E)+rT)/($\delta_1$T$^{1/2}$)+0.5$\delta_1$T$^{1/2}$, d2=d1−$\delta_1$T$^{1/2}$, $\delta_1$ is the second standard deviation of the research-and-develop value of each company of the corresponding subgroup, N(d3) is the accumulative standard normal distribution function valued at d3, N(d4) is the accumulative standard normal distribution function valued at d4, d3=(ln(WPV/E)+rT)/($\delta_2$T$^{1/2}$)+0.5$\delta_2$T$^{1/2}$, d4=d3−$\delta_2$T$^{1/2}$, and $\delta_2$ is the second standard deviation of the patent value of each company of the corresponding subgroup.

8. A computer implemented evaluation method, for generating a predicted value of a technology, the method comprising:

(1) storing a set of stock prices of each company of a group of reference companies;

(2) storing a set of net asset values of each company of the group of reference companies;

(3) producing a set of intangible asset predicted values of each company of the group of reference companies by responding to the stock prices and the net asset values of each company of the group of reference companies with computer means;

(4) dividing the group of reference companies into N compared subgroups responsive to a first predetermined condition;

(5) producing a set of referred factors of any of the N compared subgroups according to the N compared subgroups and the set of intangible asset predicted values of each company of the group of reference companies;

(6) inputting a predetermined time and a predetermined cost of the technology needed for launch;

(7) mapping the technology to one corresponding subgroup of the N compared subgroups;

(8) producing the predicted value of the technology according to the predetermined time, the predetermined cost and the set of referred factors of the corresponding subgroup, wherein the set of intangible asset predicted values of each company of the group of reference companies comprises a research-and-develop value and a patent value, and the research-and-develop value is as follows:

$$V_{RD}=(Vs \times Ns - Vn) \times E_{RD} \div E_T,$$

wherein $V_{RD}$ is the research-and-develop value, Vs is stock price of each company of the group of reference companies, Ns is the number of the issued shares of each company of the group of reference companies, Vn is the net asset value of each company of the group of reference companies, $E_{RD}$ is the research and development expense of each company of the group of reference companies, and $E_T$ is the total expense of each company of the group of reference companies; and the patent value is as follows:

$$V_P = V_{RD} \times \div N_P,$$

wherein $V_P$ is the patent value, $V_{RD}$ is the research-and-develop value, and $N_P$ is the issued patent number of each company of the group of reference companies wherein the set of referred factors of the corresponding subgroup comprises an average of the research-and-develop value of each company of the corresponding subgroup, a first standard deviation of the research-and-develop value of each company of the corresponding subgroup, an average of the patent value of each company of the corresponding subgroup, and a first standard deviation of the patent value of each company of the corresponding subgroup, and the predicted value of the technology is smaller than EV1 but equal to or greater than EV2, wherein EV1=RV*N(d1)−(E/e$^{rT}$)*N(d2), EV2=PV*N(d3)−(E/e$^{rT}$)*N(d4), RV is the average of the research-and-develop value of each company of the corresponding subgroup, PV is the average of the patent value of each company of the corresponding subgroup, E is the predetermined cost of the technology needed for launch, T is the predetermined time of the technology needed for launch, e is a natural exponent, r is a predetermined rate, N(d1) is an accumulative standard normal distribution function valued at d1, N(d2) is the accumulative standard normal distribution function valued at d2, d1=(ln(RV/E)+rT)/($\delta_1$T$^{1/2}$)+0.5$\delta_1$T$^{1/2}$, d2=d1−$\delta_1$T$^{1/2}$, $\delta_1$ is the first standard deviation of the research-and-develop value of each company of the corresponding subgroup, N(d3) is the accumulative standard normal distribution function valued at d3, N(d4) is the accumulative standard normal distribution function valued at d4, d3=(ln(PV/E)+rT)/($\delta_2$T$^{1/2}$)+0.5$\delta_2$T$^{1/2}$, d4=d3−$\delta_2$T$^{1/2}$, $\delta_2$ is the first standard deviation of the patent value of each company of corresponding subgroup.

* * * * *